United States Patent [19]
Mengelt et al.

[11] Patent Number: 5,579,197
[45] Date of Patent: Nov. 26, 1996

[54] BACKUP POWER SYSTEM AND METHOD

[75] Inventors: Kevin R. Mengelt, Port Edwards; Michael J. Cane, Mauston; Mark L. Schultz, Wisconsin Rapids, all of Wis.

[73] Assignee: Best Power Technology, Incorporated, Necedah, Wis.

[21] Appl. No.: 377,540

[22] Filed: Jan. 24, 1995

[51] Int. Cl.$^6$ ........................................................ H02H 3/00
[52] U.S. Cl. ........................... 361/93; 361/18; 307/66
[58] Field of Search ........................... 361/93, 115, 18, 361/90; 307/66

[56] References Cited

U.S. PATENT DOCUMENTS

| | | | |
|---|---|---|---|
| 4,031,463 | 6/1977 | Norberg | 324/77 |
| 4,277,692 | 7/1981 | Small | 307/66 |
| 4,366,389 | 12/1982 | Hussey | 307/66 |
| 4,400,624 | 8/1983 | Ebert, Jr. | 307/43 |
| 4,473,756 | 7/1984 | Brigden et al. | 307/66 |
| 4,516,035 | 5/1985 | Rhoads et al. | 307/66 |
| 4,692,854 | 7/1987 | Baxter, Jr. et al. | 363/75 |
| 4,694,402 | 7/1987 | McEachern et al. | 364/492 |
| 4,713,553 | 12/1987 | Townsend et al. | 307/64 |
| 4,763,014 | 8/1988 | Model et al. | 307/66 |
| 4,797,936 | 1/1989 | Nakatsugawa et al. | 382/1 |
| 4,814,934 | 3/1989 | Jones et al. | 361/88 |
| 4,890,005 | 12/1989 | Schomack | 307/87 |
| 4,956,563 | 7/1990 | Schomack | 307/66 |
| 5,055,703 | 10/1991 | Schomack | 307/64 |
| 5,229,651 | 7/1993 | Baxter, Jr. et al. | 307/66 |
| 5,315,533 | 5/1994 | Stich et al. | 364/480 |

OTHER PUBLICATIONS

U.S. Patent Application S.N. 08/161,338, filed Dec. 2, 1993 by Kevin R. Mengelt for "Method and Apparatus for Efficient Phase and Frequency Coherence Locking Optimized for Digital Systems", Group Art Unit 2306.

Best Power Technology, Inc., Patriot User Guide, No. LTS–0379F, 1994.

Best Power Technology, Inc., Patriot System Schematic, No. C 3263 G01, Oct. 16, 1991, revised Jan. 18, 1994.

*Primary Examiner*—Jeffrey A. Gaffin
*Assistant Examiner*—Stephen W. Jackson
*Attorney, Agent, or Firm*—Foley & Lardner

[57] ABSTRACT

A backup power system has power supply lines extending from input terminals, connectable to a main AC power system, and output terminals, connectable to a load, with a relay connected in a power supply line. The AC input power is monitored and when a fault in the power is detected, the relay is opened and an inverter is simultaneously turned on to provide backup power from a battery to the output terminals at a phase and frequency synchronized with the AC input voltage before the fault occurs. When the AC power system power is restored, the inverter power is again synchronized with the AC input power at the input terminals, the relay switch is closed and the inverter is turned off to allow the main power system to provide power to the load. The inverter may be providing power to the power lines before the relay contacts are opened to minimize the disruption of power supplied to the load during transfers. The switching of the switching devices in the inverter is cut off if the current drawn by the inverter from the battery exceeds a current limit level, but is turned on again after a short period of time less than a cycle of the AC waveform to again attempt to provide power from the inverter to the load. This process may be repeated, if necessary, to provide power to loads which require higher currents during start-up of the load than during normal operation after start-up.

21 Claims, 6 Drawing Sheets

Microfiche Appendix Included
(2 Microfiche, 93 Pages)

5,579,197

BACKUP POWER SYSTEM AND METHOD

This application includes a microfiche appendix listing of a computer program having 2 microfiche and 88 frames. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of electrical power systems, and particularly to backup power supplies or systems.

BACKGROUND OF THE INVENTION

Uninterruptible power supplies or systems, commonly referred to as UPS, are used to provide backup power to critical loads such as computer systems, industrial microprocessor controlled systems, and the like, where a loss of line power can result in the interruption of programs and the loss of valuable data or a system malfunction. The UPS may also provide a line power conditioning function to ensure that transient spikes, low voltage conditions, or distorted power waveforms on the AC power system do not disturb the operation of the computer or other system which is supplied with power through the UPS. Typically, the UPS includes a battery which is interfaced through an inverter to the AC output line. Various designs for backup or uninterruptible power systems have been developed. Generally, it is desirable that the power supplied to the critical load from the backup power system should be without a substantial break or discontinuity of power flow despite breaks in the main AC power system power. Systems which can provide power without observable breaks or discontinuities in the waveform of the voltage supplied to the critical load despite loss or disruptions of the AC input power are often complex and relatively expensive.

Lower cost backup power systems have been introduced which are intended for use with individual desk top computer systems rather than larger (and more expensive) computers or local area networks. These less expensive types of backup power systems commonly utilize a mechanical relay as the means by which power is transferred from the AC power system to the battery powered inverter. As a consequence, the power transfer is typically slow, with an often significant break in the power supplied to the critical load. Such systems are sometime referred to as "standby power supplies" or SPS in distinction from true uninterruptible power supplies in which there is no significant break in the output voltage waveform. A simplified block diagram for a typical backup power system of this type is illustrated in FIG. 1. The backup power system receives power from the main AC power system 20 at its input terminals 21 and supplies power to a critical load 22 from its output terminals 23 and 24. A relay coil 25 is connected across the two AC power lines 26 and 27 of the backup power system, and this relay coil is coupled to a first set of relay contacts 28 and a second relay contact 29. The relay contacts 28 switch from a first position, illustrated in FIG. 1, in which the relay 28 supplies power from the input terminals 21 on the power line 26 to the output terminal 23. In the second position of the switch 28, power is supplied to the relay 28 from an inverter 30 which receives DC input power from a battery 31 through the relay switch 29 when it is closed. When AC input power is available across the input terminals 21, the relay coil 25 is energized, which holds the relay contacts 28 and 29 in their position shown in FIG. 1. When the AC input power from the power system 20 fails, the relay coil 25 is de-energized, causing the relay contact 29 to close to provide DC power from the battery 31 to the inverter 30, and causing the relay contact 28 to switch to connect the output of the inverter 30, which is now turned on to supply AC output power, through the contact 28 to the output terminals 23 and 24 to supply power to the load 22. When the AC power system 20 comes back on line and again supplies AC power to the terminals 21, the relay coil 25 is again energized, switching the relay contacts 28 and 29 so that power is again supplied to the load from the main AC power system. Because of the time required to fully de-energize the relay coil 25 and the relatively slow operating time of the mechanical switches 28 and 29, a substantial break in the output power supplied to the load is inevitably encountered both when switching the supply of power from the power system to the inverter and when switching back again from the inverter to the power system. Because of the way the relay coil is activated, such systems generally do not provide switching of power during events other than complete power failure, such as overvoltages from the power system 20 or low voltages (brownouts).

A loss of power of several milliseconds can be tolerated by some loads which have the capability of riding through the power loss, for example, conventional incandescent lamps or motors. Some types of electronic equipment have a power supply with a relatively large input power supply filter which has sufficient stored energy to supply the consuming load during the time required to transfer power from the power system to the inverter and vice versa.

There are also many types of critical loads for which a break in the input voltage waveform of as short as two milliseconds can cause the load to fail. For example, high intensity discharge lights such as those used in many hospital operating rooms may extinguish upon loss of power for a relatively short period of time, in the range of a few milliseconds, and may require a significant period of time (e.g., several minutes) before they can be restarted. Modern computers and other types of electrical equipment often include power factor correcting power supply circuits which are designed to improve the power factor which is presented to the AC power line. Such power factor corrected power supplies typically produce an input current waveform which tracks the shape and phase of the AC input voltage., to provide a corrected power factor that approaches unity. Power factor correcting power supplies which utilize an active high frequency correction system may not tolerate disruptions in AC input power very well. In certain cases, a break in input power flow of the length typical of standby power systems as illustrated in FIG. 1 can cause instabilities and oscillations in the power factor corrected power supply, and a consequent failure of a computer receiving power from the power supply.

A variation of the backup power supply design of FIG. 1 which also has been utilized is shown in FIG. 2. In this system, a line voltage detector 35 is connected by lines 36 and 37 to the AC power lines 26 and 27. The line voltage detector 35 is connected to the relay coil 25 and also to the inverter 30. The detector 35 monitors the AC input power across the lines 26 and 27. When a power fault is detected, in accordance with the specifications of the line voltage detector, the detector de-energizes the relay coil 25 to switch the position of the relay 28 from its first position, as shown in FIG. 2, in which power is supplied from the AC power system to the load, to its second position in which it connects the load 22 to the inverter 30. The line voltage detector 35 is also connected to the inverter 30 to turn it on at the same time that it is de-energizing the relay coil 25. Because the switch 28 can only connect either the input line 26 to the output terminal 23 (to supply AC power from the AC power system to the load 22), or connect the inverter 30 to the output terminal 23 (to connect the inverter to the load), the inverter 30 and the AC power system 20 are never connected together in parallel. The configuration of FIG. 2 has the advantage over that of FIG. 1 that power failures other than a complete input line failure can be detected and backup power can be supplied to the load under such conditions, but the time required to de-energize the coil 25 and switch the mechanical switch 28 from its first position to its second position still results in a substantial interruption of power to the load, typically at least 4 or 5 milliseconds and often 10 to 50 milliseconds or more, which cannot be tolerated by many types of critical loads as discussed above.

In high performance backup power systems, which may be denoted as true uninterruptible power supplies, switching of the power supplied to the load from the main AC power system to an inverter is typically accomplished using high speed static switches. Disruptions of the voltage waveform supplied to the load are virtually nonexistent or of such small magnitude as to be unnoticed by the load. Such systems may also include mechanical relays in the main power path from the AC input to the AC output in addition to the static switches to provide galvanic isolation of the AC input terminals of the system from the inverter when it is operating. Such isolation may be required by electrical codes in many countries. In such systems, the static switches are used to provide quick disconnection of power from the main AC power system and connection of the inverter to supply power to the load with a subsequent opening of the relay contacts to provide the galvanic isolation. An example of such a backup uninterruptible power system is shown in U.S. Pat. No. 5,315,533 to Stich, et al. The static switch in the main power path is used to very quickly disconnect the AC input power from the output as the inverter is being turned on. Because of the switching speed of the static switches, the potential interruptions of the AC voltage waveform applied to the load will be a small fraction of a 60 Hz cycle.

SUMMARY OF THE INVENTION

A backup power system in accordance with the present invention utilizes a simple and efficient power transfer structure while nonetheless yielding fast power transfers in response to various main power system fault conditions to provide substantially uninterrupted power to a critical load. During normal conditions on the main AC power system, the backup power system of the invention provides an electrically continuous main power path from its input terminals to its output terminals through mechanical relays without the use of a static switch in the main power path. As a consequence, when power is available from the main power system, the backup power system consumes very little power itself, with its only power requirements being for battery charging and the internal power supplies for its electronic control components. Its efficiency thus is as great as or greater than the most efficient standby power supplies.

The backup power supply of the invention provides fast and sensitive line fault detection to determine when the main AC power system has failed or is in another fault condition, for example—an overvoltage, a low (but not zero) voltage, or significant input waveform distortion. When such fault conditions are detected, the backup power system turns on an inverter powered by a battery to supply power coupled through a transformer directly to the AC output terminals of the backup power system simultaneously with opening of the main relay switch contact in the main power path. No static switch is used to isolate the inverter from the main power path as the inverter is turned on and before the relay contacts are fully opened. The AC output voltage provided from the inverter is synchronized to the phase and frequency of the AC input voltage waveform prior to the fault. The fault detection occurs rapidly and the inverter is turned on immediately when the fault is detected so that the critical load sees little or no disruption of the power supplied to it despite the failure of the AC power from the main power system. When the backup power system is providing power through the inverter to the load and the main AC power system is restored, the availability of the AC power system power is detected and transfer is made back to AC power. The inverter phase and frequency is synchronized to the AC power system voltage waveform before the transfer and the relay contacts in the main power path are closed before the inverter is turned off.

Because of the synchronization of the inverter output with the AC input voltage waveform, substantially no current is backfed from the inverter to the AC power system. If either during transfer from the AC power system to the inverter or from the inverter back to the AC power system the input terminals of the backup power system are effectively shorted, the inverter will be controlled to turn off when a selected limiting value of current is reached. However, the switching devices in the inverter will be switched back on after a short delay time to again attempt to supply AC power to the load. If the current does not reach the current limit condition, the inverter remains on and continues to supply power to the load. If the current limit is reached, the switching devices of the inverter are again switched off for a short period of time and then turned back on, and the process repeated until the inverter is able to assume supply of power to the load, or, where a fault condition on the load exists (e.g., a shorted load), the inverter will be shut down and a fault message provided to the user. In addition, the operation of the backup power system of the present invention in this manner allows start-up of various types of loads which have very low effective impedance upon start up, for example, incandescent lamps which have a low resistance until they heat up, as well as the power supplies of some electronic equipment which have a large filter capacitor which needs to be charged up upon start-up.

The present invention particularly provides fast detection of faults in the main AC power system power so that transfers of power occur rapidly and with minimum disruption of the power supplied to the critical load. Fast and accurate decisions concerning the quality of the incoming AC waveform allow transfers to be made before the power supplied to the load is significantly distorted, and further minimize the number of unnecessary transfers where the incoming line voltage may differ from an ideal sinusoid at the prescribed frequency and rms voltage, but nonetheless is adequate to supply power to the load. The line fault detection in accordance with the present invention compares the voltage level at a particular point in the cycle of the incoming line voltage with the voltage level at a corresponding point in the cycle of a reference waveform, and adds the absolute value of the difference between the two to an existing value in an accumulator or memory location. The value in the accumulator is also decremented by a selected value each time it is updated. The new sum in the accumulator upon each update is compared to a threshold value. If the sum in the accumulator exceeds the threshold, it is concluded that a line fault has occurred and a trigger is provided which simultaneously turns on the inverter and opens the relay or relays in the main power path. The incoming voltage waveform is preferably sampled many times during each cycle of the waveform and compared with the reference waveform. If the power from the main power system completely fails in a rapid manner between samples, the difference at the next sample between the reference waveform and the sampled value will be sufficiently large that, when it is added to the accumulator, the trigger will immediately be given. If the differential between the incoming line voltage and the reference is less than the value which would cause an immediate trigger, it is added to the value in the accumulator and the sum in the accumulator will build up over time if the deviation between the reference waveform and the incoming waveform continues at a large level. Eventually, the sum in the accumulator will exceed the trigger level and the trigger will be provided to turn on the inverter and open the relay switch. The value in the accumulator is decremented on each sample by a constant amount so that if the deviations between the reference waveform and the incoming line voltage are not sufficiently large as to be potentially disrupting to the critical load (for example, where a minor drop in line voltage occurs for some reason such as several loads being connected to the power circuit) the sum in the accumulator will not build up sufficiently to exceed the trigger threshold. To detect when an excessive brownout condition occurs, such that the voltage level will not be sufficient to adequately supply the load, the square of the input waveform for each cycle is calculated and compared to a lower limit value (and preferably to an upper limit value) and a trigger is provided to switch power from the inverter if the limit(s) is reached.

The reference waveform is preferably updated each cycle by averaging the value of the previously existing reference waveform at a particular point in the cycle with the newest waveform sample at the corresponding point in the cycle, and utilizing the average value as the new reference waveform value for that point in the cycle. In this manner, the reference waveform can adapt to systematically distorted AC power line waveforms which are not pure sinusoids but are sufficient to provide adequate power to the critical load.

The transformer by which the inverter is coupled to the main power path is also preferably utilized to supply power for charging the battery of the backup power system. Under such circumstances, the winding of the transformer connected to the main power path acts as a primary and the winding of the transformer connected to the inverter acts as a secondary from which power is supplied through a charger to the battery.

The operation of the line pulse detection, main power path relay switching, inverter operation and battery charging is preferably controlled by a programmable microcontroller operating under software control. Preferably, the microcontroller is the only electronic equipment operating at high frequency in the backup power system to minimize electromagnetic interference (EMI) emissions. The components of the backup power system of the invention external to the microprocessor utilize signals which are all at relatively low frequencies (e.g., at 1,000 Hz or less), thereby introducing substantially no EMI emissions at radio frequencies. Consequently, EMI shielding of the components of the system is not required.

If desired, power consumption through the transformer may be minimized by disconnecting the transformer from the main power path with a fast static switch when neither battery charging nor inverter operation is required. This fast static switch may be turned on very quickly when the inverter is turned on to supply power to the load upon occurrence of a fault on the main AC power system. When the battery charger is in operation, the static switch may be turned on to couple the battery charger to the main power path through the transformer.

Further objects, features and advantages of the invention will be apparent from the following detailed description when taken in conjunction with the accompanying drawings.

DETAILED DESCRIPTION OF THE INVENTION

Figure 1:
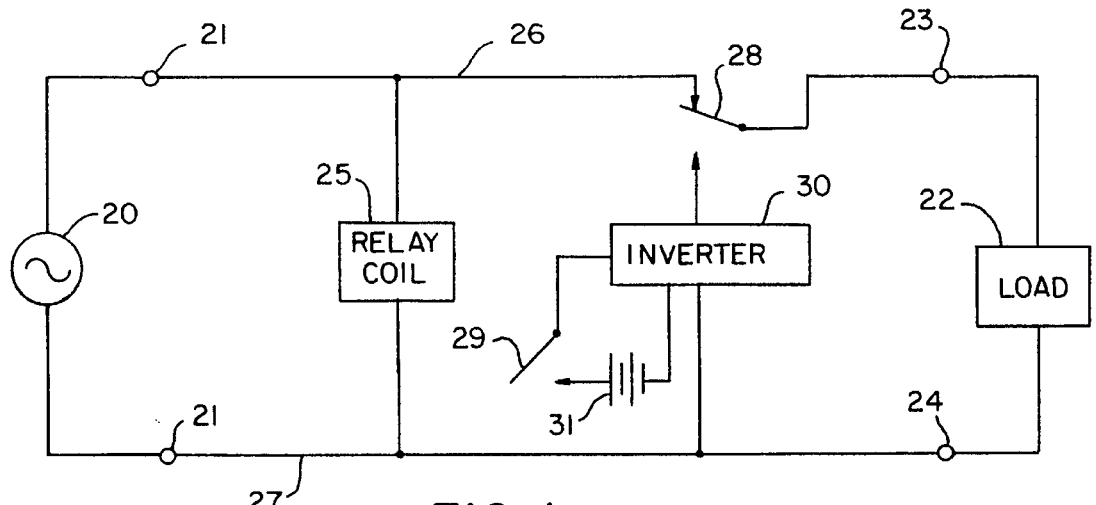
FIG. 1 is a simplified block diagram of a prior art standby power supply.
Figure 2:
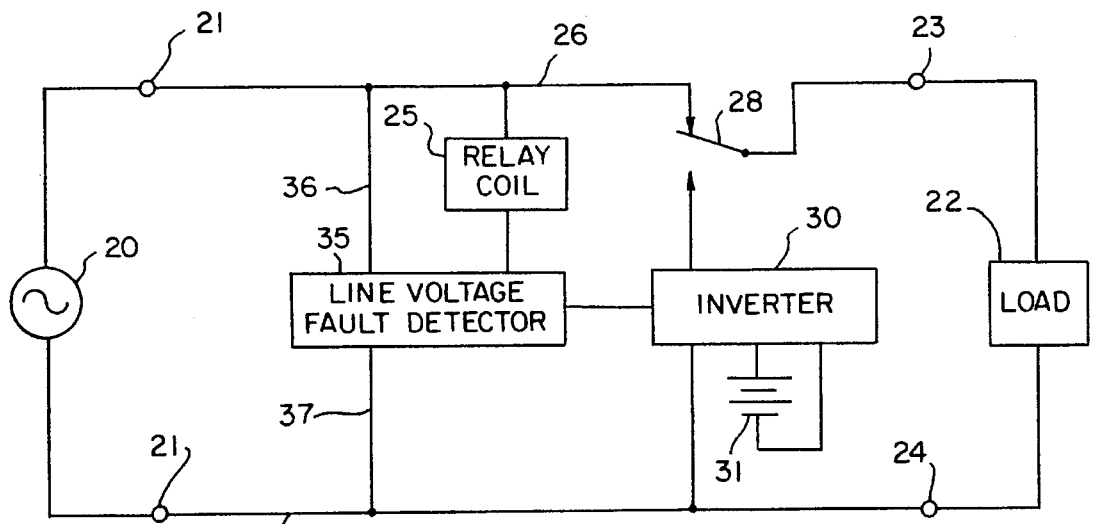
FIG. 2 is a simplified block diagram of a further type of standby power supply in accordance with the prior art.
Figure 3:
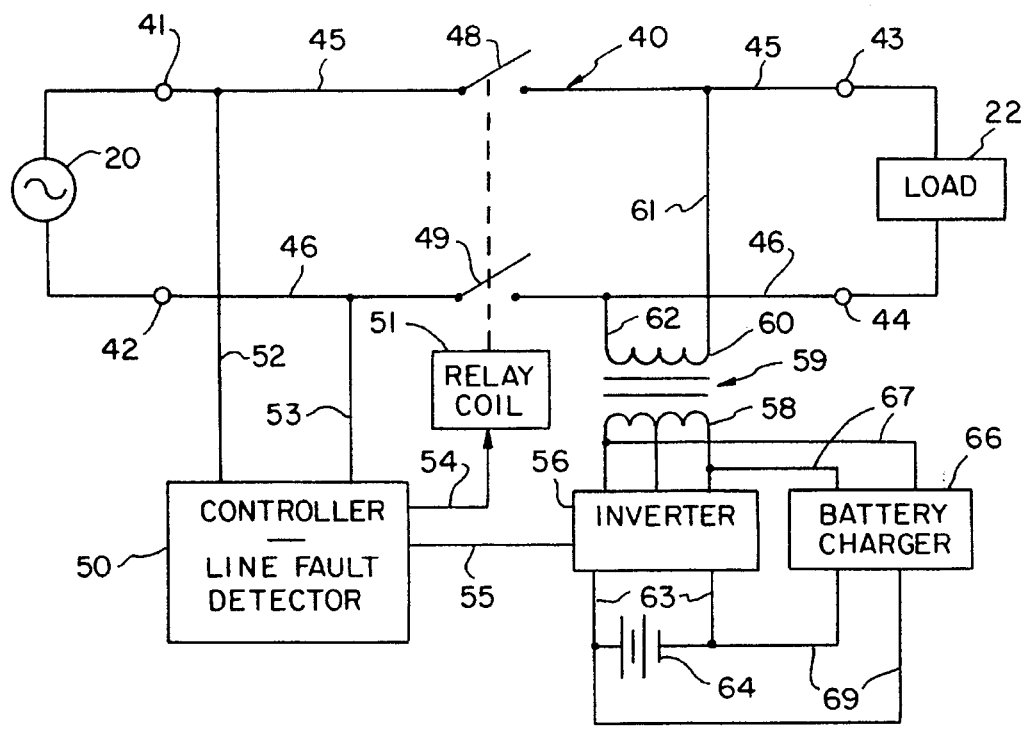
FIG. 3 is a simplified block diagram of the backup power system of the present invention.

With reference to the drawings, a simplified block diagram of a backup power system in accordance with the present invention is shown generally at 40 in FIG. 3 connected to receive power from a main AC power system 20 at its input terminals 41 and 42 and to provide power to a load 22 from its output terminals 43 and 44. The backup power system 40 has a main power path comprising a first power line 45 connected between the input terminal 41 and the output terminal 43 and a second line 46 connected between the input terminal 42 and the output terminal 44. A first relay contact switch 48 is connected in the power path line 45 to selectively provide or break conduction continuity on the line 45 to connect or disconnect the supply of power between the input terminal 41 and the output terminal 43. A second relay contact switch 49 may be connected in the power path line 46 to be operated simultaneously with the switch 48, although only one of the switches 48 or 49 is required to provide operation in accordance with the present invention. The relay switches 48 and 49 are operated by a relay coil 51 which, when energized, closes the switches 48 and 49 (although the switches; 48 and 49 could be operated such that they are normally closed and are opened when the relay coil 51 is energized). As shown in FIG. 3, the relay switches 48 and/or 49 are the only electrical control components connected in the main power path composed of the power lines 45 and 46, so that when the switches 48 and 49 are closed, a very low resistance electrical conducting path is provided between the terminals 41 and 43 and the terminals 42 and 44. No static switch is required to be connected in the main power path in either of the lines 45 or 46.

The backup power system 40 further includes a controller 50 which is connected by conducting lines 52 and 53 to the power path lines 45 and 46, respectively, to monitor the voltage across these lines, and thereby the voltage across the input terminals 41 and 42 from the AC power system 20. The controller 50 is connected by control lines 54 to the relay coil 51 to energize or de-energize the coil as appropriate. The controller 50 is further connected by control lines 55 to an inverter 56. The inverter 56 is connected to the primary 58 of a transformer 59. The secondary 60 of the transformer 59 is connected by lines 61 and 62 to the power path lines 45 and 46. The inverter 56 receives DC power on lines 63 from a battery 64. When the inverter is operating, it converts the DC power from the battery 64 to AC power on the primary 58 of the transformer 59, with the AC power from the secondary 60 of the transformer being imposed across the lines 45 and 46 and thus across the output terminals 43 and 44 to supply power to the load 22. A battery charger 66 receives input power on lines 67 from the primary 58 of the transformer, which acts as a secondary when power is available on the lines 45 and 46 from the main AC power system 20. The battery charger 66 delivers DC charging power on lines 69 to the battery 64 to keep it at a desired level of charge.

In the present invention, when the controller 50 determines that a fault has occurred in the power supplied from the main AC power system 20, it issues a control signal on the lines 54 to control the relay coil 51 to open the switches 48 and 49, while simultaneously applying control signals on the lines 55 to the inverter 56 to turn on the inverter to provide AC power to the primary 58 of the transformer 59. The phase and frequency of the power supplied by the inverter are synchronized by the action of the controller 50 to the phase and frequency of the input power from the power system 20 prior to the time of the fault so that the AC output power provided to the load 22 from the inverter is at the same phase and frequency as the input power was before the fault. Moreover, the synchronization of the power provided from the inverter 56 with the AC input power minimizes the disruption in the AC waveform provided to the output terminals 43 and 44 during transfer, and further minimizes possible backfeed of power from the inverter through the lines 45 and 46 to the AC power system 20. Generally, if the switch contacts 48 and 49 have not yet opened to disconnect the output terminals 43 and 44 from the AC power system 20, the difference in instantaneous voltage from the main AC power system 20 and from the output lines 61 and 62 of the transformer 59, as provided from the inverter 56, will be relatively small, so that any backfed current will also be small and will be limited in duration to the time required for complete opening of the switches 48 and 49 (a few milliseconds at most). As explained further below, even if the main AC power system 20 fails in a manner which results in complete instantaneous loss of voltage from the main AC power system (an unlikely occurrence under realistic conditions) and becomes a dead short across the input terminals 41 and 42, the inverter 56 is controlled to limit the output current from the inverter to a selected value, and then to turn off for a selected period of time (e.g., a few microseconds) which is much less than a whole cycle at the power system frequency (e.g., 20 ms at 50 Hz or 16.67 ms at 60 Hz). After the short turn-off period, the inverter is turned back on, again in synchrony with the input voltage waveform before the fault. If the relay contacts 48 and 49 have now opened, the inverter will continue operating normally. If the switch contacts 48 and 49 are still closed, the inverter will again current limit and shut off for the short period of time, and then turn back on again. Eventually, after a selected short delay, the relay contacts 48 and 49 will fully open, allowing the inverter to operate normally.

Figure 4:
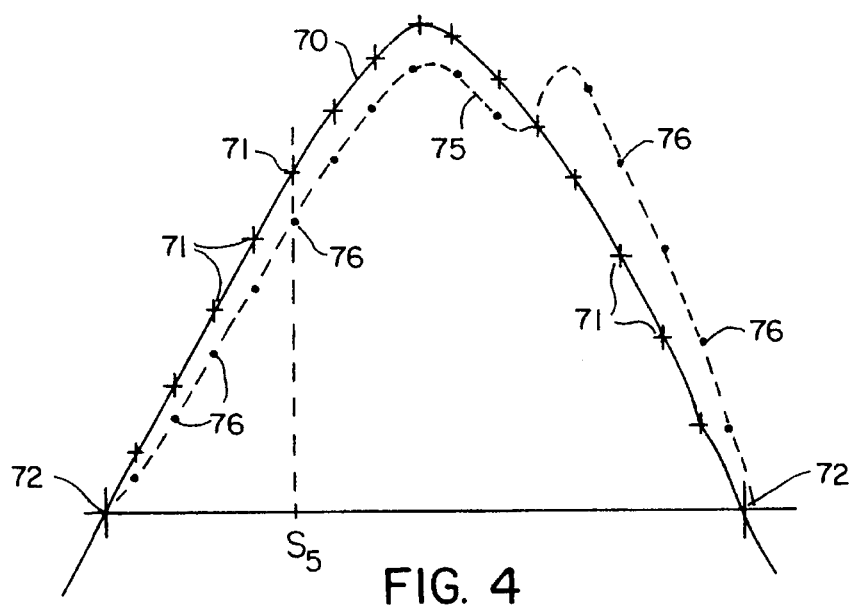
FIG. 4 is an illustrative graph showing the comparison of a reference waveform with samples of an incoming AC power system voltage waveform for the detection of line power faults in accordance with the present invention.

As noted above, the controller 50 provides detection of power line faults in a rapid and efficient manner, determining both when the AC voltage waveform is sufficiently out of tolerance (either high or low in voltage) or distorted as to constitute an unusable power waveform (or no power at all), while avoiding unnecessary switches to inverter which would deplete the battery and introduce unnecessary power glitches. With rapid and accurate detection of line fault, transfers of power from AC line to inverter (and vice versa) utilizing the backup power system structure described above can be accomplished in 2 to 3 milliseconds or less. The line fault detection procedure may be illustrated generally with respect to FIG. 4, which shows a reference waveform 70 having discrete sample values at points 71 referenced to the ideal zero crossing 72 of each half of the (presumably sinusoidal) power frequency input waveform. For various reasons, the actual input waveform 75 from the AC power system 20 may differ from a true sinusoid, and is shown, for illustrative purposes in FIG. 4 as having harmonic components that distort the waveform. The present invention determines the time between zero crossings of the input voltage waveform 75, and therefore the frequency and period of the input waveform, and samples the waveform 75 at points in time synchronized to the detected zero crossings of the waveform. The sampled value 76 of the actual input waveform 75 is then compared with the value 71 of the reference waveform at the corresponding sample point in the cycle, e.g., the sample point $S_5$ shown in FIG. 4. The difference between the actual sample and the reference value may then be utilized to determine whether a line fault has occurred.

In the present invention, the controller 50 preferably includes an analog-to-digital (A/D) converter which samples the incoming waveform a selected number of times each cycle (e.g., 32 times a half-cycle). The controller, which includes a microprocessor operating under program control, determines the zero crossings and therefore the phase and frequency of the incoming waveform. A reference waveform has sample values stored in a memory which correspond to the relative points in the cycle at which the new incoming waveform is sampled. For example, the sampling of the waveform is preferably synchronized to the incoming waveform such that each half cycle of the waveform is sampled a selected integer number of times (e.g., 16 or 32), despite changes in the phase and frequency of the input waveform. The first sample from the incoming waveform is then compared with the first value in the reference waveform memory, the second sample with the second value in the reference waveform memory, and so on. At each sample, the absolute value of the difference between the sample of the incoming waveform and the reference waveform is provided to an accumulator which adds the new difference to the existing value in the accumulator. For example, the accumulator function may be programmed in the microcontroller which stores the sum in a designated memory location. The reference waveform for that point in the cycle is then preferably updated by averaging the existing value of the reference waveform with the new sampled value to create a new reference waveform value for the next cycle. The formation of a reference waveform in this manner is described in U.S. Pat. No. 5,229,651, the disclosure of which is incorporated herein by reference. A selected value is also subtracted or decremented from the sum in the accumulator at each sample. Each time a new sum is formed in the accumulator, the value of that sum is compared with a predetermined threshold trigger value. If the sum in the accumulator reaches the trigger threshold, the controller provides the output signals on the lines 54 to the relay coil 51 and to the inverter 56 on the lines 55 to turn on the inverter and to open the relay switch contacts 48 and 49. By also subtracting a small value from the accumulator for each sampling point, the value in the accumulator is bled down when the differences between the reference waveform and the incoming waveform are not so great as to indicate a true line fault or loss. In this manner, several minor noise events will not unnecessarily cause the controller to switch the supply of power to the inverter. However, when a large difference in the reference waveform and the input waveform occurs between samples (for example, where the input voltage drops rapidly toward zero), the difference value added to the accumulator upon that sample will exceed the trigger threshold immediately, and immediately cause the controller to start the inverter and open the relay switch contacts 48 and 49. Further, a persisting large change in amplitude, indicative, for example, of a ringing down of the voltage, will also cause the sum in the accumulator to increase sufficiently over a few samples to reach the trigger threshold and cause the inverter to be turned on.

The controller further provides for detection of brownouts (excessive reductions in the magnitude of the incoming AC voltage without total loss of power). In accordance with the invention, brownout detection may be carried out by the controller by operating on the line voltage samples to determine an effective running rms value of the sampled waveform. This may be carried out in the microprocessor by squaring each voltage sample and adding the squared value to an accumulator (e.g., by storing the sum in a memory location) within the microcontroller. The sum of the squares of the sampled values over an entire half cycle provides essentially an integration of the squared values for the half cycle. At each line zero cross, the sum in the squares-accumulator can be compared against a predetermined brownout threshold value. If desired, the square root of the sum of the squares may be taken before the comparison is made, but doing so adds an additional computation step and generally has been found not to be necessary. If the sum of the squares is less than the brownout threshold, the line voltage is considered to be excessively low and the controller activates the inverter and opens the relay switch contacts. If the sum of the squares is greater than a further high threshold value, set at a level which indicates a significant overvoltage, the controller 50 preferably acts to turn on the inverter 56 and open the relay contacts 48 and 49 to prevent excessive voltages from being imposed on the load. If the sum of the squares value in the accumulator is within the desired range at the end of the half cycle, the accumulator is reinitialized to zero and the squares of the samples for the next half cycle are added together in the accumulator and the comparison process is repeated. In this manner, the critical load is protected against either excessively low or excessively high persisting voltages.

As noted, the controller monitors the incoming waveform, determines the zero crossings, and measures the time between zero crossings to determine the AC line power frequency and phase. If the frequency of the AC input power falls outside a predetermined range about the prescribed power frequency (e.g., 50 Hz in Europe and 60 Hz in the United States), the line input power is considered not to be acceptable and the controller again turns the inverter on and opens the relay contact switches.

The manner of operation of the accumulator within the controller 50 may be illustrated with respect to the following expression:

$$NC_n = Abs(VR_n - VS_n) + NC_{n-1} - K$$

where $NC_n$ is the numerical sum count in the accumulator (e.g., in a designated memory location) at a sample point "n", $VR_n$ is the reference waveform value at the particular sample point "n", $VS_n$ is the value of the sample of the input voltage waveform at the sample point "n", $NC_{n-1}$ is the previous count in the accumulator, K is a decrement value to be subtracted at each sample, and Abs represents absolute value. $NC_n$ can decrease to zero but cannot be negative. It is noted that the subtractive value K may be selected or varied as a function of the environment or the particular application for the backup power system. For some applications, K may be a constant, a linear function of the sample point n, or a complex function of the sample point n or of another variable. One value for K which is suitable for many applications is obtained by setting K equal to the value of the trigger threshold divided by six. For example, when the threshold is set to provide a trigger when the value in the accumulator is 48, K is preferably set at 8. These values preferably can either be programmable by the user of the backup power system or be preset default values. Where the backup power system is utilized with motors and/or generators, there are often large and highly distorted random fluctuations and undulations of the AC line waveform. In such cases, the line loss detection threshold will generally be set higher, and the value of K can be increased or specifically selected by empirical means to determine the best operating characteristics with the motor/generator set.

The line detection system as set forth above will result in a line fault detection where either large voltage transients or total line loss occurs. A rapid burst of noise, indicating an incipient line power failure, will also tend to be detected as a line fault. A slow accumulation of transients or line events, which are sufficiently small in magnitude as not to be likely to affect the operation of a critical load such as a computer, will, however, not be detected as a line fault and will not cause activation of the inverter. If the incoming AC voltage remains clean for a long enough period of time, the accumulator will be decremented sufficiently that its total will be brought down to zero (but not less than zero). Consequently, it is seen that the line fault detector in accordance with the present invention will be more sensitive to line faults when a history of small transients in the input AC power has occurred in the recent past than where the recent AC power waveform has been clean.

Figure 5:
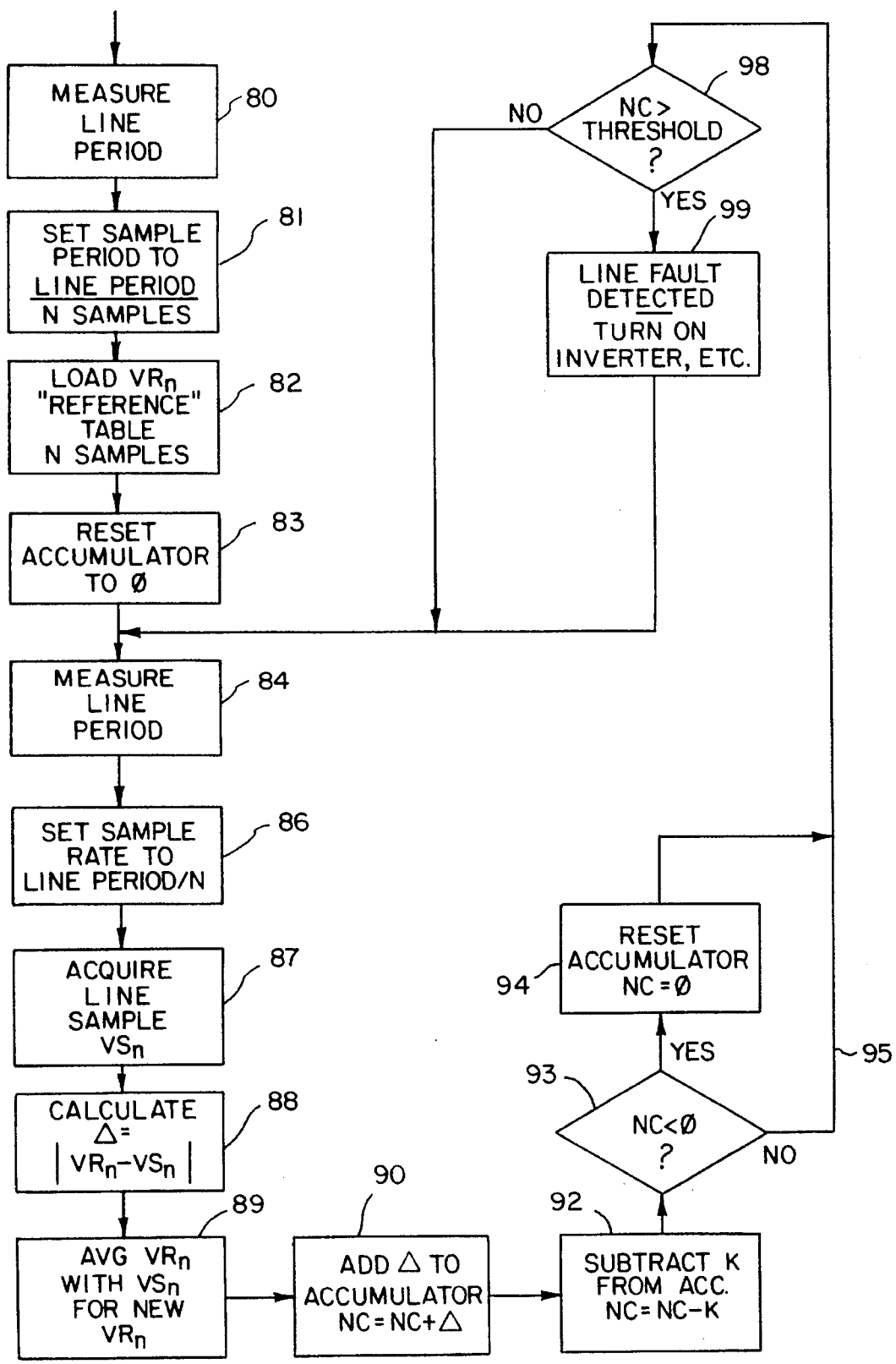
FIG. 5 is a flow chart showing the steps carried out by the microcontroller of the backup power system in performing line fault detection in accordance with the present invention.

The operation of the microprocessor program within the controller 50 to carry out line fault detection is illustrated with respect to the flow diagram of FIG. 5. The program is further described in the microfiche appendix program listing. The AC input line period is initially measured at 80 and the sample period is set equal to the line period divided by the selected number N of samples at 81. The reference sample table is then filled with N samples initially selected, for example, to correspond to a sinusoidal waveform at 82. The accumulator is reset to 0 at 83 and the line period is measured at 84. The sample rate is set equal to the line period divided by the total number of samples "N" taken during a cycle at 86, and a first line sample $VS_n$ is acquired at 87. The absolute value of the difference between the reference waveform value $VR_n$ and the present sample $VS_n$, denoted $\Delta$, is then calculated at 88, a new reference waveform value $VR_n$ is then determined as the average of the present sample $VS_n$ and the previous value of $VR_n$ at 89, the $\Delta$ is added to the accumulator value NC at 90 and the loss factor K is subtracted from the accumulator value NC at 92. The value NC in the accumulator at this point is then compared at 93 to determine whether it is less than zero; if so, the accumulator is reset to zero at 94 before proceeding; if not, the program continues on a path 95 to determine at 98 whether the accumulator value exceeds the threshold trigger level. If so, the controller puts out a signal at 99 indicating that a line fault has been detected and turns on the inverter and opens the relay switches, before proceeding back to the block 84 to measure line period. If the accumulator value is less than the threshold at block 98, no action is taken and the program again returns to the block 84 to measure the line.

Figure 6:
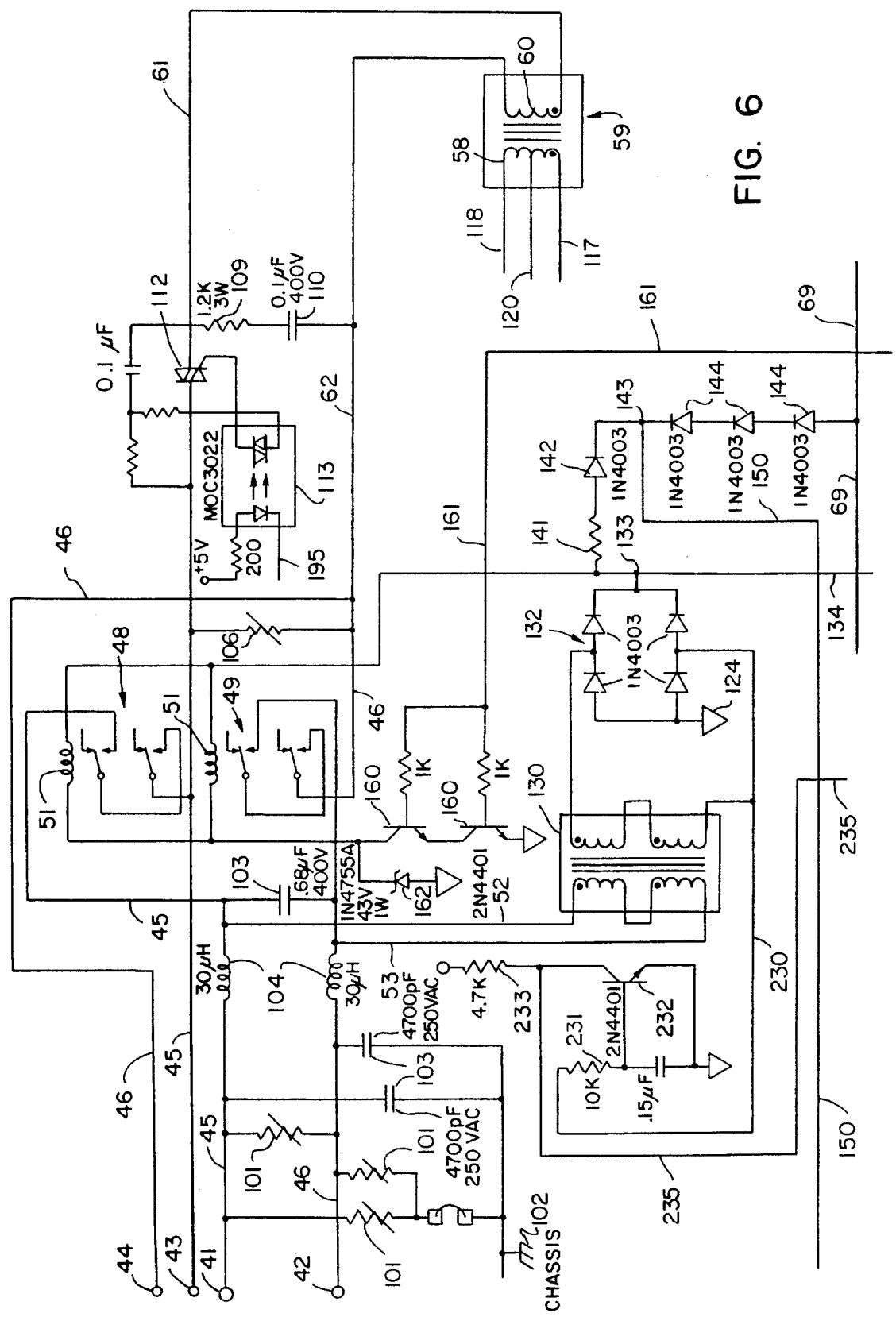
FIG. 6 is a more detailed schematic circuit diagram of a portion of the power control and monitoring circuitry of the present invention.
Figure 7:
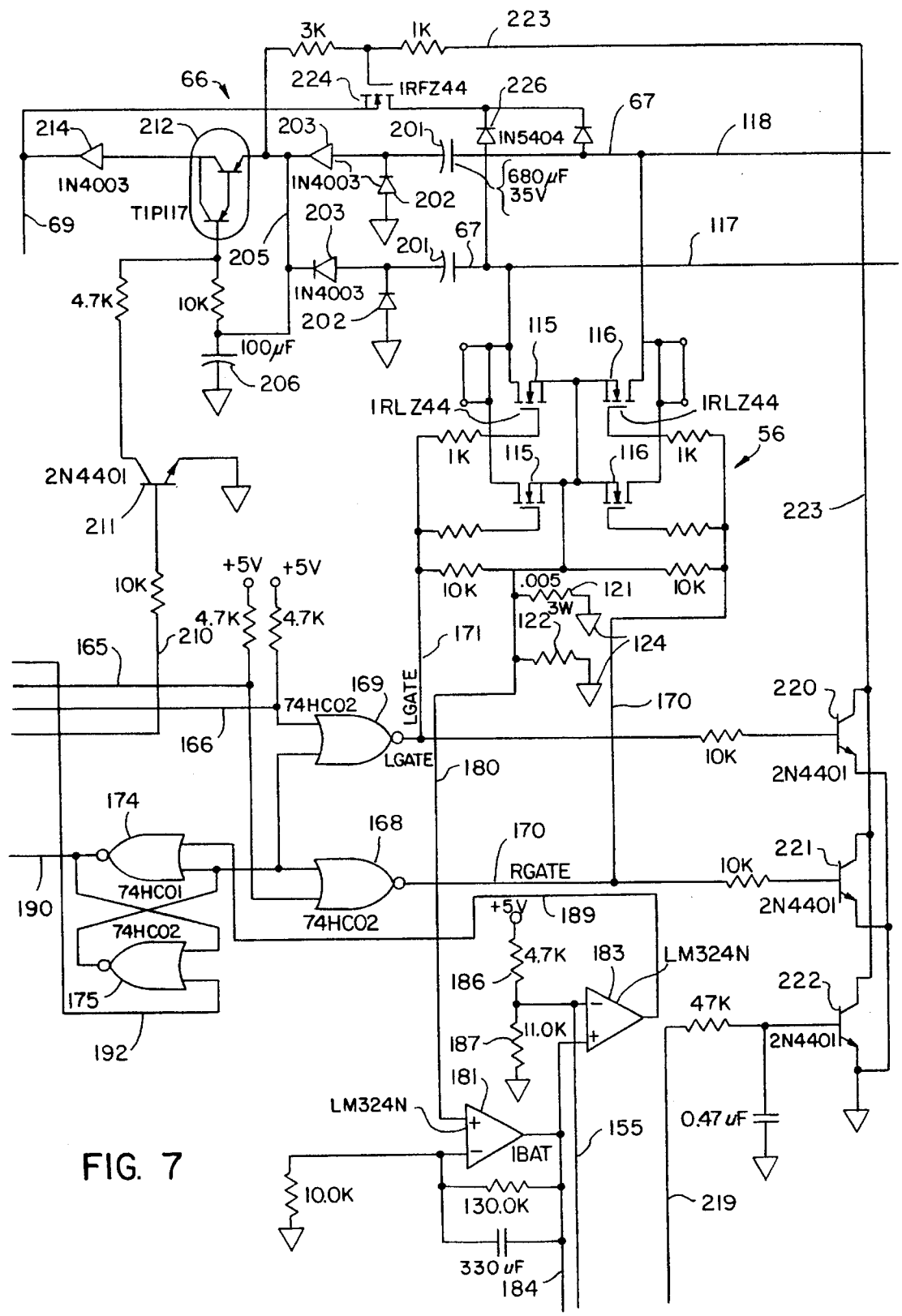
FIG. 7 is a detailed circuit schematic of another portion of the power control and monitoring circuitry of the present invention.
Figure 8:
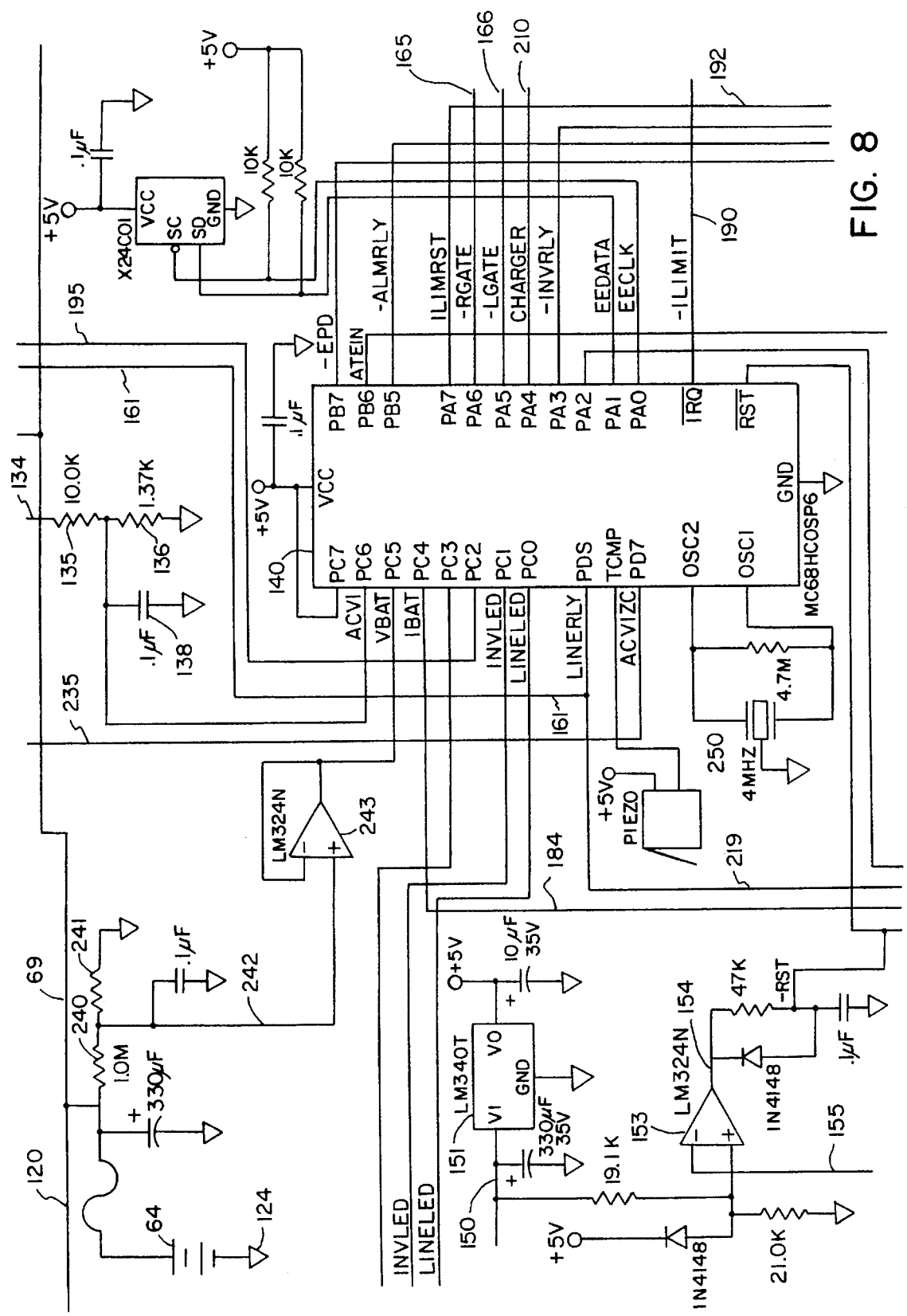
FIG. 8 is a detailed circuit schematic of a further portion of the power control and monitoring circuitry of the present invention.

A more detailed schematic circuit diagram of the backup power system 40 is shown in FIGS. 6, 7 and 8, which should be reviewed together and in which electrical lines extending between figures have the same reference numbers in each figure. The main power path through the power system is shown in FIG. 6, with the input terminals 41 and 42 available to be connected to an AC power line and the output terminals 43 and 44 available to be connected to a load. To provide protection from surge voltage spikes, conventional varistors 101 (e.g., metal oxide varistors) are connected across the power path lines 45 and 46 and between the power path lines and chassis ground 102, as are capacitors 103. A series inductor 104 is connected in at least one of the lines 45 and 46 for similar reasons. The power on lines 45 and 46 is then passed through the relays 48 and 49, each of which preferably consists of the double relay contacts illustrated in FIG. 6 for redundancy. As noted, only one of the relay switches 48 and 49 need be utilized, although both relays may be required by some electrical codes. Another metal oxide varistor 106 is connected between the lines 45 and 46 on the other side of the relays 48 and 49 from the input terminals 41 and 42. The critical load is connected to the output terminals 43 and 44, which are shown on the left side of FIG. 6 for convenience. A resistor 109 and a capacitor 110 are connected across the output lines 61 and 62 from the secondary 60 of the transformer 59 to provide some filtering of the inverter output voltage, and a triac 112 is connected in the output line 61, receiving its trigger signal from an opto-isolator 113, to allow the application of power from the AC power system to the transformer 59. As discussed further below, the transformer 59 is used during the normal availability of power on the input terminals to charge up the battery 64. However, once the battery is fully charged, it is no longer necessary to supply AC power to the transformer 69 and, depending on the transformer design, some energy can be lost in the transformer. The triac 112 allows the transformer to be disconnected from the power circuit when normal AC power is available and charging of the battery is not required, but to be quickly coupled back to the main power lines 45 and 46 when the inverter 56 (not shown in FIG. 6) is turned on to supply power to the load.

As illustrated in FIG. 7, the inverter 56 is preferably composed of pairs of paralleled MOSFETs (for redundancy) connected in a push-pull arrangement, with one pair of MOSFETs 115 connected to a line 117 leading to one end terminal of the primary 58, and a second pair of MOSFETs connected to a line 118 leading to the opposite end terminal of the primary 58. The center tap of the primary 58 is connected by a line 120 to the positive voltage terminal of the battery 64. The pairs of MOSFETs 115 and 116 are both connected through resistors 121 and 122 to a common return 124 to a which the negative side of the battery is also connected. The pairs of MOSFETs 115 and 116 can thus be controlled to switch in, for example, a push-pull fashion to produce a stepped square wave output from the secondary 60 of the transformer 59.

The monitoring and control components of the backup power system 40 are also shown in the schematic circuit diagrams of FIGS. 6, 7 and 8. Referring to FIG. 6, lead lines 52 and 53 are connected to the power lines 45 and 46 to provide the incoming AC line voltage to a step-down voltage sense transformer 130. The transformer 130 reduces the 120 volt rms input voltage to approximately 12 volts rms at the secondary of the transformer 130, and the output voltage on the secondary is provided to a bridge 132 of diodes which provides a full-wave rectified output voltage between an output node 133 and the common return 124. The output voltage from the node 133 is passed on a line 134 to a precision scaler (see FIG. 8) composed of resistors 135 and 136 which divide the output voltage of the bridge by, e.g., a factor of 10. The resulting scaled voltage is applied to the analog-to-digital converter input of a programmable microcontroller 140. A capacitor 138 is connected to the output of the divider composed of the resistors 135 and 136 to remove high frequency transients which may otherwise affect the performance of the analog-to-digital (A/D) converter and to supply the pulsed current needed by the A/D converter as it acquires data.

The output voltage at the node 133 is also passed through a resistor 141 and a diode 142 to a node 143 (see FIG. 6). Series connected diodes 144 are also connected between the node 143 and a line 69 which carries the positive battery voltage. An "OR" circuit is effectively formed at the node 143 which provides either the (e.g., 12 volt) voltage of the battery 64 to the node 143 or the output voltage from the rectifier bridge 132 as passed through the resistor 141 and the diode 142. The node 143 is thus supplied with power from the AC power system when such power is applied to the input terminals 41 and 42, but remains energized and supplied with power by the battery 64 if the AC power system fails.

When AC power is applied to the input terminals 41 and 42, a DC voltage appears at the node 143 which is applied via a line 150 to a 5 volt voltage regulator 151 (shown in FIG. 8) which supplies 5 volt DC power to the active electronics of the system. Simultaneously, the voltage on the line 150 derived from the AC input voltage is also applied as one input of a reset amplifier circuit 153. This circuit, of standard design, produces a negative pulse on an output line 154 which is applied to the reset input of the microcontroller 140 when AC power is first applied to the input terminals 141 and 142. The other input of the amplifier 153 is provided from a line 155 as discussed further below. The unfiltered full wave rectified voltage at the node 133 is, as noted above, simultaneously applied to the microcontroller 140 where it is converted to digital data to be used to implement a high speed digital phase locked loop. Reference waveform formation and reference waveform polarity are synchronized with the phase locked loop derived signal, and line frequency and phase information are similarly available from the phase locked loop signal. Digital phase locked loops and the derivation of line frequency therefrom are well known in the art. Such digital phase lock loops are described, for example, in U.S. Pat. No. 5,315,533, and U.S. application Ser. No. 08/161,338, filed Dec. 2, 1993, now U.S. Pat. No. 5,473,533, the disclosures of which are incorporated herein by reference. The A/D converter within the microcontroller 140 produces a digital output which is related to the instantaneous amplitude of the incoming waveform. The sampling intervals or times for the A/D converter are determined within the microcontroller, and the sampled data which represents the waveform amplitude at each sampling point is written into memory within the microcontroller. The reset input from the reset amplifier 153 also serves to reset an accumulator counter within the microcontroller to zero. As the full-wave rectified input voltage is applied to the microcontroller, the microcontroller provides crossover detection, line frequency determination, and generation of inverter drive signals that are phased so that, if AC power fails, gating signals will be provided to the MOSFETs 115 and 116 to provide an output voltage from the secondary 60 of the transformer 59 which will be in phase with the incoming line voltage before the fault.

The voltage at the node 133 is also provided to the relay coils 51 which control the relays 48 and 49. The power provided to the relay coils 51 is returned to common through a pair of series connected transistors 160. The drive signal to the bases of the transistors 160 is provided on a line 161 from the microcontroller 140. When line voltage is present, the microcontroller turns on the transistors 160 to supply power through the relay coils 51 to hold the relay switches 48 and 49 in a position providing conduction between the input nodes 41 and 42 and the output nodes 43 and 44. If line power fails, the microcontroller 140 will provide a signal on the line 161 to turn off the transistors 160, and thereby deactivate the relay coils 51 and open the relay switches 48 and 49. A zener diode 162 is connected to the relay coils 51 to allow any current in the coils to free wheel and quickly dissipate when the transistors 160 are turned off. The series connection of the two transistors 160 provides redundancy such that if one of the transistors fails shorted, the other transistor will still be able to control the opening of the relay switches 48 and 49.

The microcontroller 140 provides the gate drive signals for the MOSFETs 115 and 116 on an output line 165 for the "right" gate drive and an output line 166 for the "left" gate drive. These signals are provided through NOR gates 168 and 169, respectively, on lines 170 and 171 to the gates of the MOSFETs 116 and 115. It should be understood that although power MOSFETs have been illustrated as the preferred switching devices, any of various other types of switching devices may be used, including other types of the power semiconductor switches, fast mechanical switches, etc. As used herein, a "gate controlled switching device" is any device that can be controlled by a "gate" control signal to make and/or break conduction through it. The gate drivers 168 and 169 are controlled by a current limit latch composed of NOR gates 174 and 175. The output of the latch NOR gate 175 is applied to one of the inputs of each of the NOR gates 168 and 169. In normal operation, the output of the gate 175 is low and the driver gates 168 and 169 are enabled, thereby connecting the left gate and right gate inverter drive signals from the microcontroller 140 through to the lines 170 and 171 and thence to the gates of the MOSFETs, which are switched in a push-pull fashion to cause current to flow in the primary windings 58 of the transformer 59, providing 120 volts rms output in a quasi-sinewave at the output terminals 43 and 44 of the system. The switching may be accomplished in a simple fashion forming a quasi-sinewave of square waves with dead zones (zero volts) between the positive and negative square wave pulses during the switching cycle around the normal zero crossing of the waveform. If desired, the inverter may be implemented in other ways, including as a pulse width modulated inverter with suitable low pass filtering on the output of the inverter to provide substantially sinusoidal waveform output power where desired.

The DC current drawn from the battery and flowing through the MOSFETs 115 and 116 of the inverter 56 is effectively related to the voltage across the paralleled resistors 121 and 122 which appears on a conducting line 180. The voltage on the conducting line 180 is provided to a shunt amplifier 181, and the output of the amplifier 181 (proportional to the battery current) is provided to a comparator 183 and on a line 184 to an input to the microcontroller 140 which allows the microcontroller to monitor the battery current. A voltage divider composed of resistors 186 and 187 provides a voltage reference (e.g., 3.5 volts) to the other input of the comparator 183 and on the line 155 to the comparator 153. When the output of the amplifier 181 exceeds the reference voltage from the voltage divider, indicating that the inverter current has exceeded a specified level, the comparator 183 changes state and provides an output signal on a line 189 to a second input of the latch gate 174, causing the gates 174 and 175 to change state. The output of the gate 175 now becomes high, disabling the outputs of the NOR gates 168 and 169 and thus turning off the gate signals to the MOSFETs 115 and 116. The output signal from the NOR gate 174 is also provided on a line 190 to the microcontroller 140 to provide an indication when the current limit has occurred. After the lapse of a predetermined time interval, for example, a few microseconds, the microcontroller 140 puts out a current limit reset signal on a line 192 to a second input of the latch gate 175, causing the latch to reset and change state. Gating signals are then again applied through the gate drivers 168 and 169 to the MOSFETs 115 and 116. If the current again rises above the set level at which the comparator 183 changes state, the gates will again be disabled. This process can continue for a desired period of time which is determined to be sufficient for the inverter to assume supply of power to a load which has to be driven up to its normal operating conditions. Generally, continuing the process for about two and one-half seconds has been found sufficient. If the process continues for more than this selected length of time, the inverter will be shut off and an alarm will preferably be issued to the user since this situation indicates that there probably is a defect in the load, for example, a short circuit. By retriggering the inverter in this manner, the backup power system of the present invention can power up loads which change impedance as they are brought up to operating condition, for example, cold light bulbs.

When charging of the battery is not desired, the microcontroller 140 disconnects the transformer 59 from the AC power lines 45 and 46 by providing a transformer control signal on an output line 195 to the opto-isolator 113 so that no gate signal is provided to the triac 112 and it consequently does not conduct in either direction. When the inverter is to be operated or the battery is to be charged, the microcontroller provides a control signal on the line 195 through the opto-isolator 113 to the gate of the triac to turn it on. When it is desired to charge the battery, the microcontroller also turns the triac 112 on so that the AC power provided to the input terminals 31 and 32 is applied to the winding 60 of the transformer, which now acts as a primary. The lines 117 and 118 connected to the winding 58 of the transformer (which now functions as a secondary) have AC power thereon at a lower voltage (e.g., about 12 volts rms). The voltage on the lines 117 and 118 is provided via the lines 67 to the battery charging circuit 66. This circuit includes a voltage booster connected to each of the lines 67, including capacitors 201, a diode 202 to common, and an output diode 203, which are connected together to an output line 205 which is connected to common through a capacitor 206. The voltage across the capacitor 206, which appears on the line 205, is increased from the voltage level on the line 67. The microcontroller 140 controls the charging of the battery by providing output signals on a line 210 through a drive transistor 211 to the base of a Darlington transistor 212 which is connected to receive the voltage on the line 205. When the Darlington transistor 212 is turned on by the control signal from the microprocessor, an output voltage is provided through a diode 214 to the conducting lines 69 leading to the battery 64. The charging of the battery is preferably controlled by the microcontroller which monitors the voltage applied by the charger, and various charging procedures may be utilized as desired. For example, the battery voltage can be compared by the microcontroller with a desired voltage level for the battery, and the microcontroller can turn the transistor 212 on for a selected duty cycle, and repeat the process until the desired battery voltage is reached.

When the gate signals on the lines 170 or 171 or the line relay signal on the line 161 as passed on a line 219 is issued by the microcontroller 140, these signals are applied to the bases of parallelled transistors 220, 221 and 222. When one or more of these transistors is switched into conduction, a line 223 connected to the transistors is effectively connected to the common return 124, and voltage is applied to the gate of a power transistor (e.g., an MOSFET) 224 to turn it on. The MOSFET 224 is connected by diodes 226 between the conducting lines 67 and the output lines 69, and when turned on will effectively shunt the voltage booster and the Darlington transistor 212 so that these do not impose a load on the output of the inverter 56.

To provide rapid detection of the zero crossings of the input voltage waveform, one terminal of the secondary of the transformer 130 is connected by a line 230 through an input resistor 231 to the base of a transistor 232. The transistor is provided with power at its collector through a resistor 233 connected to the 5 volt power supply. The collector of the transistor 232 is connected by a line 235 to an input of the microcontroller 140. The output signal on the line 235 from the collector of the transistor 232 will thus change state once each cycle as the polarity of the output voltage on the line 230 from the transformer 130 changes, and this signal can be used by the microcontroller to determine the frequency and phase of the AC line power.

The voltage across the battery 64 may be monitored by the controller 140 through a voltage divider composed of resistors 240 and 241, with the voltage from the divider being provided on a line 242 to one input of an amplifier 243 which supplies its output to one of the inputs of the controller 140 which digitizes the input voltage to data utilized by the microcontroller.

Other conventional components not shown in the circuit diagram of FIGS. 6, 7 and 8 may be incorporated to perform conventional features such as input/output communications which will be apparent to those of ordinary skill. It is noted that the internal switching frequency of the microcontroller 140 is controlled by a piezocrystal 250. The microcontroller 140 (e.g., a Motorola MC68HC05P6) may switch at a high switching frequency (e.g., 4 MHz), as appropriate and desired. Nonetheless, the signals that are supplied to the microcontroller 140 and the signals provided by the microcontroller are all at a much lower switching frequency, typically in the range of 1 kHz or less. The only component external to the microcontroller 140 which operates at a high frequency is the crystal 250, which may be mounted closely adjacent to the microcontroller 140. Consequently, the microcontroller 140 is the only element in the system which is capable of radio frequency emissions, and such components are conventionally constructed by the manufacturer to minimize such emissions. By maintaining all high frequency switching within the microcontroller, virtually no shielding of other portions of the circuitry is required to avoid unwanted or excessive EMI emissions from the backup power system.

It is understood that the invention is not confined to the particular embodiments set forth herein as illustrative, but embraces all such modified forms thereof as come within the scope of the following claims.

What is claimed is:

1. A backup power system connectable to a main AC power system at input terminals and to a load at output terminals, comprising:

(a) a battery;

(b) power supply lines forming a main power supply path from the input terminals to the output terminals to normally supply power from an AC power system connected to the input terminals to a load connected to the output terminals such that an AC voltage at the output terminals is synchronized in phase and frequency to an AC voltage at the input terminals;

(c) a relay having switchable relay contacts connected in at least one of the power supply lines in the main power supply path and including a control coil responsive to a control signal to switch the relay contacts from a position providing conduction continuity in the power supply line to a position breaking conduction continuity through the power supply line, the relay being the only switching device in the power supply path so that an electrically continuous main power path is provided from the input terminals to the output terminals when the relay contacts are closed;

(d) a transformer having a secondary connected to the power supply lines between the relay contacts and the output terminals and a primary coupled to the secondary;

(e) an inverter having gate controlled switching devices connected to receive DC power from the battery and having an output connected to provide AC power to the primary of the transformer when the switching devices are switched; and (f) control means, connected to provide control signals to the control coil of the relay and to the gates of the gate controlled switching devices of the inverter, and including means for sensing the voltage at the input terminals and determining when a power line fault occurs in the main AC power system, and upon occurrence of a fault for providing a control signal to the relay control coil to open the relay contacts and for simultaneously turning on the inverter by providing control signals to the gates of the switching devices of the inverter to generate an AC output voltage waveform at the output of the inverter and thereby at the secondary of the transformer to provide AC output power across the output terminals, the controller monitoring the phase and frequency of the AC input voltage before the fault occurs and controlling the gates of the inverter to provide AC output voltage from the inverter which is synchronized in phase and frequency to the AC input voltage from the AC power system before the fault, wherein the control means further includes means for sensing the current drawn from the battery through the inverter to the load and for turning off the control signals to the gates of the switching devices when a selected current limit level is reached for a selected short period of time less than a cycle of the AC waveform, for thereafter turning on the control signals to the gates of the switching devices to provide the AC voltage waveform from the inverter and for again turning off the signals to the gates if the current drawn from the battery through the inverter exceeds the selected current limit level.

2. The backup power system of claim 1 wherein the switching devices of the inverter are connected to opposite end terminals of the secondary of the transformer and the battery is connected to a center tap of the transformer, wherein the control means provides control signals to the gates of the switching devices to switch them in a push-pull manner to provide a quasi-square wave output voltage across the secondary of the transformer.

3. The backup power system of claim 1 wherein the control means further measures the voltage at the input terminals after a fault has been detected and determines when normal AC power is available at the input terminals, and after such determination provides a control signal to the control coil of the relay to switch the relay contacts from an open position to a closed position again providing continuity of conduction on the at least one of the power lines in the main power supply path and terminating the control signals to the gates of the switching devices of the inverter as the relay contacts are closed, and wherein the control means synchronizes the output voltage from the inverter in phase and frequency to the AC input power waveform at the input terminals prior to applying the control signal to the relay coil to close the relay contacts.

4. The backup power system of claim 1 wherein the control means repeats the turn-on of the control signals to the gates a selected period of time after a current limit has been reached in a repetitive manner for a selected period of time thereby to allow the inverter to drive a load up to operating condition which has low initial impedance upon start-up.

5. The backup power system of claim 4 wherein the control means terminates providing control signals to the gates of the switching devices if after a selected period of time the turn on of the switching devices results in the current limit level being reached.

6. The backup power system of claim 1 wherein the switching devices are power MOSFETs.

7. The backup power system of claim 6 including means for measuring the current drawn by the inverter from the battery, for comparing the measured current with a selected level of current indicative of an overcurrent, and for providing an output signal when the current drawn by the inverter from the battery exceeds the selected current level to disable the application of gate control signals to the power MOSFETs of the inverter.

8. The backup power system of claim 1 further including a static switch connected in a conducting line between the secondary of the transformer and one of the power lines in the main power supply path and wherein the control means controls the static switch to turn it on when the inverter is turned on to provide power flow from the inverter to the main power supply path and to turn off the static switch at selected times when the inverter is not turned on so that AC power from an AC power system on the power supply lines is not applied to the transformer.

9. The backup power system of claim 8 further including a battery charger connected to receive AC voltage appearing at the primary of the transformer when the secondary of the transformer is connected by the static switch to the AC power lines of the main power path and AC power is applied by an AC power system to the input terminals, the battery charger having a DC output connected to the battery to provide charging current to the battery, and wherein the control means controls the static switch to switch to provide AC power from the main power supply path to the transformer to allow the battery charger to charge the battery.

10. The backup power system of claim 1 wherein means for determining line faults in the control means includes:

means for sampling the AC voltage at the input terminals at periodic times and providing digital output data corresponding to the sampled input data;

means receiving the digital data corresponding to the sampled AC power signal and for producing a reference waveform at selected sample times during the period of the AC line signal, wherein each reference value at each sample time comprises a selectively weighted average of the value at that sample time in the prior cycle of the AC power system voltage waveform and the previous reference waveform value at that sample time; and means for determining the absolute value of the difference between the present sampled AC power system voltage waveform and the reference waveform at corresponding times in the AC waveforms for each sample, for adding the difference to a sum at each sample and for subtracting from the sum at each sample a selected decrement value to produce a new sum, for comparing the new sum with a trigger threshold level, and for determining that a line fault has occurred and providing a line fault signal when the sum exceeds the trigger threshold.

11. The backup power system of claim 10 wherein the control means further includes means for squaring the value of each sample of the AC input voltage and adding the squared value together in an accumulator during each cycle, and at the end of each cycle determining that a line fault has occurred and providing a line fault signal if the sum in the accumulator is above a selected high value or is below a selected low value.

12. The backup power system of claim 11 wherein the means responsive to control signals for interrupting the supply of power comprises a relay having switchable relay contacts connected in at least one of the power supply lines in the main power supply path and including a control coil responsive to a control signal to switch the relay contacts from a position providing conduction continuity in the power supply line to a position breaking conduction continuity through the power supply line, a transformer having a secondary connected to the power supply lines between the relay contacts and the output terminals and a primary coupled to the secondary, and an inverter having gate controlled switching devices connected to receive DC power from the battery and connected to provide AC power to the primary of the transformer when the switching devices are switched.

13. A backup power system connectable to a main AC power system at input terminals and to a load at output terminals, comprising:

(a) a battery;

(b) power supply lines forming a main power supply path from the input terminals to the output terminals to normally supply power from an AC power system connected to the input terminals to a load connected to the output terminals;

(c) means responsive to control signals for interrupting the supply of power through the main power supply path from the AC power system to the load and for selectively providing AC power from the battery to the power supply path and thence to the load;

(d) control means for providing control signals, upon occurrence of a line fault on the AC power system power provided to the input terminals, to the means responsive to control signals to cause the supply of power to the load to be transferred from the AC power system to the battery, the control means including:

means for sampling the voltage provided by the AC power system to the input terminals at periodic times and providing digital output data corresponding to the sampled input data;

means receiving the digital data for producing a reference waveform at selected sample times during the period of the AC line signal, wherein each reference value at each sample time comprises a selectively weighted average of the value at that sample time in the prior cycle of the AC power system voltage waveform and the previous reference waveform value at that sample time; and means for determining the absolute value of the difference between the present sampled AC power system voltage waveform and the reference waveform at corresponding times in the AC waveforms for each sample, for adding the difference to a sum at each sample and for subtracting from the sum at each sample a selected decrement value to produce a new sum for comparing the new sum with a trigger threshold level, and for determining that line fault has occurred and providing a line fault signal when the sum exceeds the trigger threshold.

14. The backup power system of claim 13 wherein the control means further includes means for squaring the value of each sample of the AC input voltage and adding the squared value together in an accumulator during each cycle, and at the end of each cycle determining that a line fault has occurred and providing a line fault signal if the sum in the accumulator is above a selected high value or is below a selected low value.

15. A backup power system connectable to a main AC power system at input terminals and to a load at output terminals, comprising:

(a) a battery;

(b) power supply lines forming a main power supply path from the input terminals to the output terminals to normally supply power from an AC power system connected to the input terminals to a load connected to the output terminals;

(c) a controllable switch in at least one of the power supply lines in the main power supply path responsive to a control signal to switch from providing conduction continuity in the power supply line to breaking conduction continuity in the power supply line;

(d) an inverter operatively connected to the power supply lines between the controllable switch and the output terminals, the inverter having gate controlled switching devices connected to receive DC power from the battery and to provide AC power to the power supply lines in the output terminals when the inverter switching devices are switched; and (e) control means providing control signals to the controllable switch in the main power supply path when a fault occurs in the AC power system power provided to the input terminals and to provide control signals to the gates of the gate controlled switching devices of the inverter to generate an AC output voltage waveform at the output of the inverter and thereby at the output terminals, and further including means for sensing the current drawn from the battery through the inverter to the load and for turning off the control signals to the gates of the switching devices when a selected current limit is reached for a selected short period of time less than a cycle of the AC waveform, for thereafter turning on the control signals to the gates of the switching devices to provide the AC voltage waveform from the inverter and for again turning off the signals to the gates if the current drawn from the battery through the inverter exceeds the selected current limit level.

16. The backup power system of claim 15 wherein the switching devices of the inverter are power MOSFETs.

17. The backup power system of claim 15 wherein the control means repeats the turn-on of the control signals to the gates a selected period of time after a current limit has been reached in a repetitive manner for a selected period of time thereby to allow the inverter to drive a load up to operating condition which has low initial impedance upon start-up.

18. The backup power system of claim 17 wherein the control means terminates providing control signals to the gates of the switching devices of the inverter if after a selected period of time the turn-on of the switching devices results in the current limit level being reached.

19. A method of controlling the switching of switching devices in an inverter of a backup power system which is coupled to output terminals connectable to a load, the backup power system normally providing power on a main power supply path from input terminals connectable to an AC power system to the output terminals when the AC power system power is available and disconnecting the main power path from the AC power system when the AC power system power fails and providing power from a battery through the inverter to the load during the fault on the AC power system, the inverter having gate controlled switching devices responsive to control signals to switch to provide AC power at an output of the inverter, comprising the steps of:

(a) sensing the current drawn from the battery through the inverter to the load;

(b) turning off the control signals to the gates of the switching devices when a selected limit level of current drawn from the battery is reached for a selected short period of time less than a cycle of the AC waveform;

(c) thereafter turning on the control signals to the gates of the switching devices to provide the AC voltage waveform from the inverter; and (d), again turning off the control signals to the gates if the current drawn from the battery through the inverter again exceeds the selected current limit level.

20. The method of claim 19 wherein the steps of turning off the control signals to the gates for a selected period of time after a current limit has been reached and thereafter turning on the control signals to the gates are repeated for a selected period of time to allow the inverter to drive a load connected to the inverter up to an operating condition, wherein the load has a low initial impedance upon start-up and a higher impedance when it reaches its operating condition.

21. The method of claim 20 including the further step of terminating the repetition of the steps of providing control signals to the gates of the switching devices if, after a selected period of time, the turn-on of the switching devices results in the current limit level being reached.

* * * * *